H. D. GRINNELL.
ELECTRIC SWITCH.
APPLICATION FILED MAR. 23, 1909.
936,775.
Patented Oct. 12, 1909.
2 SHEETS—SHEET 1.
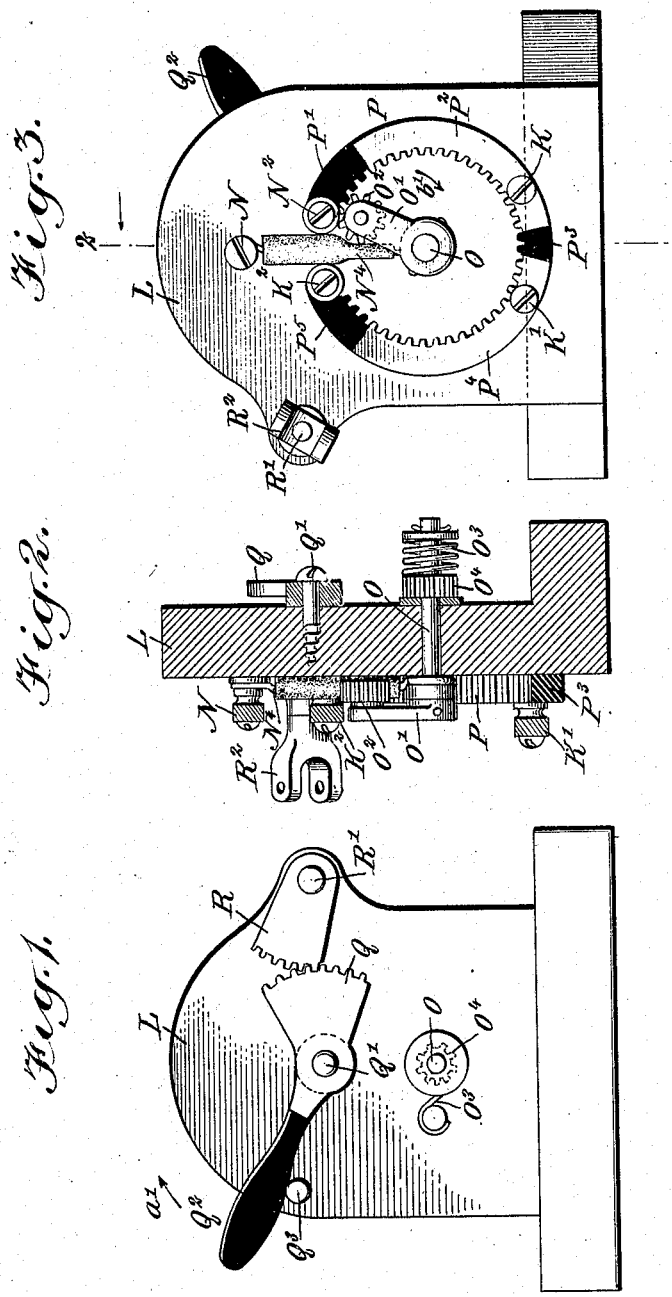
WITNESSES
INVENTOR
Harold D. Grinnell
BY
ATTORNEYS H. D. GRINNELL.
ELECTRIC SWITCH.
APPLICATION FILED MAR. 23, 1909.
936,775.
Patented Oct. 12, 1909.
2 SHEETS—SHEET 2.
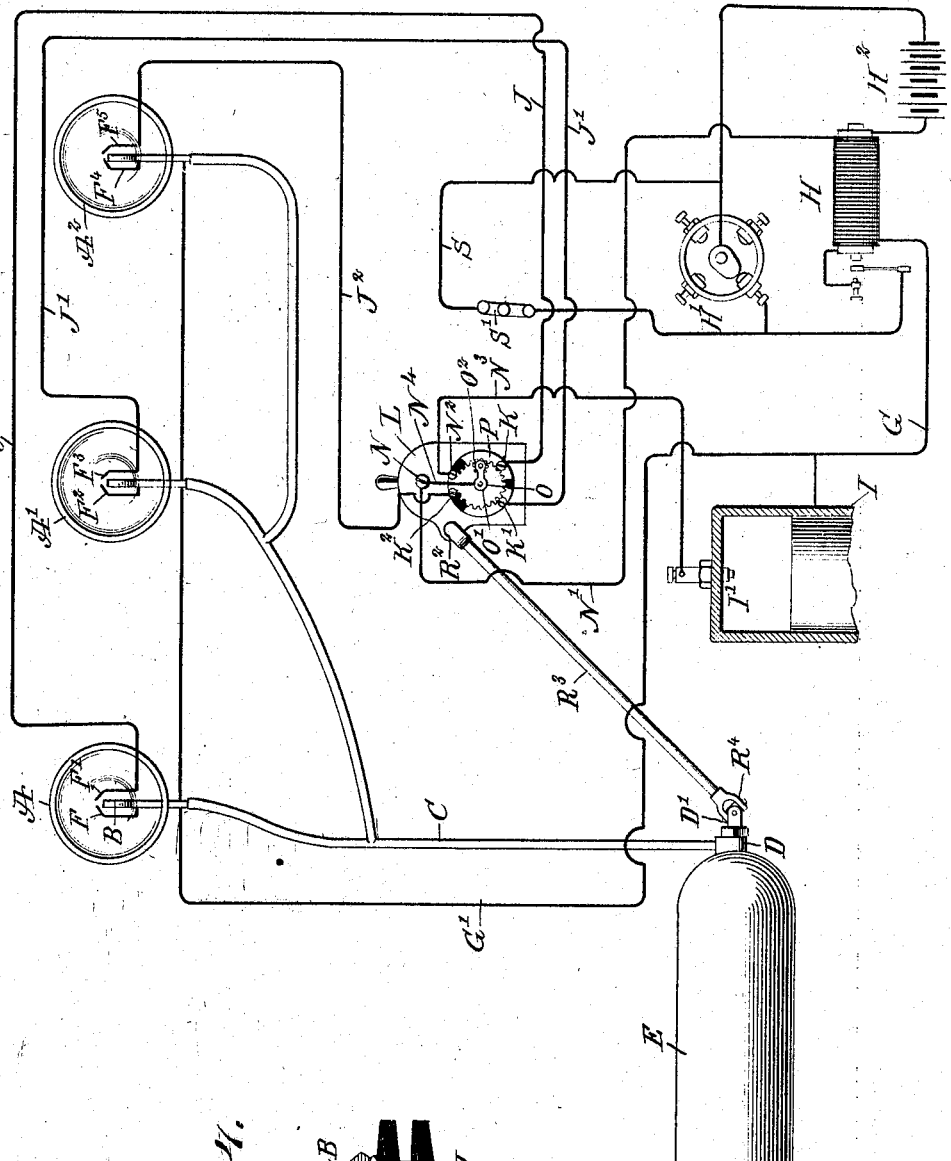
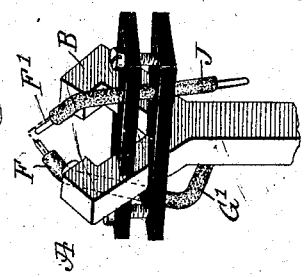
WITNESSES
INVENTOR
Harold D. Grinnell
BY
ATTORNEYS

UNITED STATES PATENT OFFICE.

HAROLD DUNCAN GRINNELL, OF NEW BEDFORD, MASSACHUSETTS.

ELECTRIC SWITCH.

936,775.          Specification of Letters Patent.        Patented Oct. 12, 1909.

Original application filed March 21, 1908, Serial No. 422,507. Divided and this application filed March 23, 1909. Serial No. 485,159.

*To all whom it may concern:*

Be it known that I, HAROLD D. GRINNELL, a citizen of the United States, and a resident of New Bedford, in the county of Bristol and State of Massachusetts, have invented a new and Improved Electric Switch, of which the following is a full, clear, and exact description, this being a division of the application for Letters Patent of the United States, for an electric lighting device for motor-vehicle lamps, Serial No. 422,507, filed by me on March 21, 1908.

The object of the invention is to provide a new and improved electric switch, more especially designed for turning on or off the gas supply for the lamps of an automobile or other motor vehicle, and at the same time controlling the igniting devices for the said lamps. The desired result is obtained by the use of a manually-controlled switch shaft, having an arm carrying a pinion in mesh with an internal gear wheel formed of alternating, insulated and contact-making sections.

A practical embodiment of the invention is represented in the accompanying drawings forming a part of this specification, in which similar characters of reference indicate corresponding parts in all the views.

Figure 1 is a front view of the switch in normal or inactive position relative to the electric lighting device, when the gas supply for the lamp and the electric current for the sparker are turned off; Fig. 2 is a transverse section of the same on the line 2—2 of Fig. 3; Fig. 3 is a rear face view of the same; Fig. 4 is a perspective view of one of the sparkers; and Fig. 5 is a diagrammatic view of the improvement, showing the switch in position after having turned on the gas supply for the lamps, cut off the current for the igniting device of the main cylinder and switched the current to the sparker of the first vehicle lamp.

As indicated in Fig. 5, three acetylene or other gas lamps A, A', A² of any approved construction, are mounted in suitable places on the motor vehicle, and the burners B for the said gas lamps A, A' and A² are supplied with gas by a pipe C provided with a gas cock or valve D, connected with the gas supply tank E, arranged on the running board or other part of the motor vehicle. Across the burners B of the gas lamps A, A', A² are arranged the spaced electrodes F, F', F², F³ and F⁴, F⁵ of the sparkers for the said burners, to light the gas by jump sparks, as the gas issues from the burners, as hereinafter more fully explained. The electrodes F, F², F⁴ are connected by a branch wire G' with the wire G connecting the induction coil H with the cylinders I of the motor, each cylinder having the usual igniting device I' for igniting the explosive mixture at the proper time, controlled by the commutator H', connected with the induction coil H and the battery H² or other source of electricity supply, and likewise connected with the induction coil H. The electrodes F', F³ and F⁵ are connected by wires J, J', J² with binding posts K, K', K² held on the switch board L attached to the motor vehicle, adjacent to the operator, and on the said switch board is arranged a main binding post N connected by a wire N', with the induction coil H, and another main binding post N² held on the said switch board L is connected by a wire N³ with the igniting device I' of one of the cylinders I. It will be understood that the binding posts may be connected with any of the cylinders, and the commutator H' is shown as connected only to the cylinder which has been shown for convenience.

In the switch board L is journaled a shaft O, on which is secured an arm O' carrying a pinion O² in mesh with an internal gear wheel P secured to the rear face of the switch board L, and formed of sections P', P², P³, P⁴, P⁵, of which the sections P', P³ and P⁵ are of insulating material, while the sections P² and P⁴ are of metal and connected with the binding posts K and K'. The main binding post N² is located at the end of the insulating section P', and the binding post K², previously mentioned, is located at the end of the insulating section P⁵ (see Fig. 3), and when the arm O' and its pinion O² are in the extreme positions, the pinion contacts with the posts N² and K². The main binding post N is connected by a wire N⁴ with the shaft O, so that when the latter and its arm O' are in the position shown in Fig. 3, then the circuit for the igniting devices I' for the several cylinders I of the motor, are closed successively by the commutator H' in the usual manner, but when the pinion O² moves out of contact with the binding post N² then the currents for the igniting devices I' are interrupted. The shaft O is pressed on by a spring O³, to normally hold the pinion O² in contact with the main binding post $N^2$, and on the said shaft O is secured a pinion $O^4$ adapted to be engaged by a segmental gear wheel Q, mounted to swing on a stud $Q'$ held on the switch board L, the segmental gear wheel Q being provided with a handle $Q^2$, normally resting against a stop pin $Q^3$ attached to the switch board L. The segmental gear wheel Q when in the normal position shown in Fig. 1, is in mesh with a segmental gear wheel R, having its shaft $R'$ journaled in the switch board L, and the shaft $R'$ is connected by a universal joint $R^2$ with a shaft $R^3$, connected by a universal joint $R^4$ with the stem $D'$ of the gas cock or valve D, for turning the gas on or off, that is, for allowing the gas to pass from the reservoir E to the several burners B, or to cut off the gas when the lamps are not used. By the arrangement described, the operator can turn the valve D more or less, to regulate the flow of gas to the several burners.

When the handle $Q^2$ is in the normal position shown in Figs. 1, 2 and 3, then the gas cock D is turned off, the electric circuit for the igniting devices $I'$ is closed subject to the action of the commutator $H'$, and the electric current is switched off from the sparkers on the burners B of the several gas lamps A, $A'$, $A^2$. Now when it is desired to light the gas lamps A, $A'$, $A^2$, it is only necessary for the operator to swing the handle $Q^2$ temporarily over in the direction of the arrow $a'$, so that the segmental gear wheel Q first turns the segmental gear wheel R, whereby the shaft $R^3$ is turned and with it the gas cock D, to allow the gas to pass from the reservoir E to the several burners B. The segmental gear wheel Q finally leaves the segmental gear wheel R at the time the cock D is open, and then on the further swinging of the handle $Q^2$ in the direction of the arrow $a'$ the segmental gear wheel Q moves in mesh with pinion $O^4$, thus turning the latter and the shaft O, whereby the arm $O'$ is caused to swing in the direction of the arrow $b'$, thus moving the pinion $O^2$ out of contact with the main binding post $N^2$, thereby interrupting the circuit for the igniting devices $I'$ of the motor cylinders I. The pinion $O^2$ after passing over the insulating section $P'$ moves in mesh with the metallic section $P^2$ carrying the binding post K, whereby the circuit for the electrodes F, $F'$ is closed, and a jump spark passes from one electrode to the other across the path of the gas now issuing through the burner B. Thus the gas is ignited and consequently the lamp A is lighted. Further turning of the arm $O'$ in the direction of the arrow $b'$ moves the pinion $O^2$ out of mesh with the section $P^4$ and in mesh with the insulating section $P^5$, so that the current for the electrodes $F^2$, $F^3$ is disconnected, and the pinion $O^2$ in finally coming in contact with the binding post $K^2$ closes the electric current for the electrodes $F^4$, $F^5$, whereby the third lamp $A^2$ is lighted. The operator now releases the handle $Q^2$ so that the spring $O^3$ returns the shaft O, the segmental gear wheel Q, the handle $Q^2$ and the arm $O'$, until the segmental gear wheel Q finally leaves the pinion $O^4$ and stands midway between the said pinion $O^4$ and the segmental gear wheel R. As soon as the segmental gear wheel Q leaves the pinion $O^4$, the spring $O^3$ continues the return movement of the shaft O and the arm $O'$, until the pinion $O^2$ makes contact with the main binding post $N^2$, so that the circuit for the igniting devices $I'$ is again closed. The above described movement of the handle $Q^2$ is very quick, so that only a temporary interruption of the current for the igniting devices $I'$ takes place, but use is made of this electric current for producing jump sparks at the electrodes F, $F'$, $F^2$, $F^3$ and $F^4$, $F^5$, as above explained.

It will be noticed that as the handle $Q^2$ does not return to the final normal position, it is evident that the gas cock D remains turned on, and when it is desired to turn out the lamps, it is only necessary for the operator to swing the handle $Q^2$ back to its final position on the stop pin $Q^3$, and in doing so the segmental gear wheel Q will turn the segmental gear wheel R to turn off the gas cock D and thus shut off the supply of gas from the reservoir E to the several burners B.

In order to permit of lighting the lamps A, $A^1$, $A^2$ at a time the vehicle is at a standstill, a shunt circuit S having a switch $S'$ is used to directly connect the battery $H^2$ with the induction coil H. The switch $S'$ is normally open and is only closed when it is desired to light the lamps A, $A'$, $A^2$ at the time the vehicle is at a standstill; it being understood that after the switch $S'$ is closed the operator swings the lever $Q^2$ around, the same as above described, to turn on the gas and to successively close the circuits for the several sets of electrodes F, $F'$, $F^2$, $F^3$ and $F^4$, $F^5$, and thus light one lamp after the other. When this has been done, the lever $Q^2$ is released and the switch $S'$ is again opened.

Having thus described my invention, I claim as new and desire to secure by Letters Patent:

1. A switch having a switch board, an internal gear wheel fixed on the said board and formed of alternating insulated and contact-making sections, a manually-controlled switch shaft, an arm on the said shaft and carrying a pinion in mesh with the said gear wheel, and a spring for returning the shaft and its arm and pinion on release of the shaft.

2. A switch having a switch board, an internal gear wheel fixed on the said board and formed of alternating insulated and contact-making sections, a manually-controlled switch shaft, an arm on the said shaft and carrying a pinion in mesh with the said gear wheel, a spring for actuating the shaft and its arm and pinion on release of the shaft, actuating means for turning on a gas supply, and a gearing connecting the said actuating means with the said shaft.

3. A switch having a switch board, an internal gear wheel fixed on the said board and formed of alternating insulated and contact-making sections, a manually-controlled switch shaft, an arm on the said shaft and carrying a pinion in mesh with the said gear wheel, a spring for actuating the shaft and its arm and pinion on release of the shaft, an operating pinion on the said shaft, actuating means for turning on a gas supply and having a pinion, and a manually-controlled segmental gear wheel for successively engaging and turning the said pinions.

In testimony whereof I have signed my name to this specification in the presence of two subscribing witnesses.

HAROLD DUNCAN GRINNELL.

Witnesses:
FREDK. D. STETSON,
ELIOT D. STETSON.